United States Patent [19]
Morii et al.

[11] Patent Number: 5,959,712
[45] Date of Patent: Sep. 28, 1999

[54] METHOD OF MANUFACTURING A LIQUID CRYSTAL DISPLAY ELEMENT HAVING A DECREASED FLUCTUATION OF APERTURE RATIO

[75] Inventors: Yasuhiro Morii; Akira Tamatani; Akira Tsumura; Shin Tahata; Masaya Mizunuma; Masayuki Fujii, all of Tokyo, Japan

[73] Assignee: Mitsubishi Denki Kabushiki Kaisha, Tokyo, Japan

[21] Appl. No.: 08/999,333

[22] Filed: Dec. 29, 1997

[51] Int. Cl.$^6$ ............................................. G02F 1/1339
[52] U.S. Cl. ................................. 349/190; 349/153
[58] Field of Search ................................. 349/190, 153

[56] References Cited

U.S. PATENT DOCUMENTS

| | | | |
|---|---|---|---|
| 4,222,635 | 9/1980 | Julke | 350/331 |
| 4,364,168 | 12/1982 | Matsuyama et al. | 349/190 |
| 4,626,303 | 12/1986 | Ogura | 349/190 |
| 4,691,995 | 9/1987 | Yamazaki et al. | 350/331 |
| 5,677,749 | 10/1997 | Tsubota et al. | 349/190 |

FOREIGN PATENT DOCUMENTS

| | | |
|---|---|---|
| 61-112128 | 5/1986 | Japan . |
| 5-127174 | 5/1993 | Japan . |
| 8-211396 | 8/1996 | Japan . |

*Primary Examiner*—William L. Sikes
*Assistant Examiner*—Tarifur R. Chowdhury
*Attorney, Agent, or Firm*—Oblon, Spivak, McClelland, Maier & Neustadt, P.C.

[57] ABSTRACT

A method of manufacturing a liquid crystal display element including steps of: (a) forming a electrode on a surface of at least one of an upper substrate and a lower substrate; (b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween; and (c) injecting liquid crystal into the gap, wherein the light energy is irradiated while each temperature of the upper substrate and the lower substrate is controlled to 55° C. or lower.

12 Claims, 3 Drawing Sheets

METHOD OF MANUFACTURING A LIQUID CRYSTAL DISPLAY ELEMENT HAVING A DECREASED FLUCTUATION OF APERTURE RATIO

BACKGROUND OF THE INVENTION

The present invention relates to a method of manufacturing a liquid crystal display element. More particularly, the present invention relates to a method of manufacturing liquid crystal display element, the method comprising steps of forming electrodes respectively on first and second substrates, aligning the first substrate with the second substrate, adjusting a gap between the first substrate and the second substrate so that the first substrate is evenly spaced apart from the second substrate by a prescribed distance, and bonding the first substrate to the second substrate.

Generally, a liquid crystal display element comprises first and second substrates and a liquid crystal layer interposed therebetween. In a manufacturing step of the liquid crystal display element, electrodes, thin film transistors (hereinafter referred to as "TFTs"), color filter, and/or an orientation film are provided respectively on surfaces of first and second substrate, and a photocuring sealing material is provided between peripheral edges of first and second substrates. Light energy for curing the photocuring sealing material is irradiated upon the photocuring sealing material so that the first substrate is bonded to the second substrate. The photocuring sealing material is provided on the periphery of an area serving as a display screen when the liquid crystal display element is completed. Liquid crystal is injected under vacuum from an opening for injecting liquid crystal. The above-mentioned opening is provided in the photocuring sealing material beforehand. Finally, the opening for injecting liquid crystal is closed to complete the liquid crystal display element.

FIG. 3 is a sectional view showing one example of a manufacturing apparatus to be used in a method of manufacturing the conventional liquid crystal display element disclosed in, for example, Japanese Unexamined Patent Publication No. 324823/1992. Referring to FIG. 3, reference numerals 5 and 6 respectively show a first transparent substrate and a second transparent substrate both of which are made of glass and the like. TFT and/or an electrode made of metal are formed on at least one of the surfaces opposite to each other (hereinafter referred to as "opposite surfaces"). The opposite surfaces include a surface of the first transparent substrate and a surface of the second transparent substrate. In the present specification the first transparent substrate 5 is called an upper substrate 5 and the second transparent substrate 6 is called a lower substrate 6. Reference numeral 7 shows photocuring sealing material. Reference numeral 8 shows a spacer for maintaining the gap between a surface of the upper substrate 5 and a surface of the lower substrate 6. Reference numeral 2 shows light energy for curing the photocuring sealing material 7. Reference numeral 12 shows an upper surface table for applying the pressure to the upper substrate 5 and the lower substrate 6. The upper surface table 12 is a part of the apparatus for manufacturing the liquid crystal display element. Light energy 2 can be transmitted through the upper surface table. It is not necessary for the light energy 2 to be irradiated only from an upper portion of the liquid crystal display element, also there is a case in which the light energy 2 is irradiated only from an lower portion of the liquid crystal display element. There is a case, the upper surface table 12 and the lower surface table 13 are opposite in the above-mentioned arrangement so that there could be a case, where optical energy 2 can be transmitted through 13.

In the conventional method of manufacturing the liquid crystal display element, the step of adjusting a gap between the upper substrate and the lower substrate so that the upper substrate is evenly spaced apart from the lower substrate by a prescribed distance and the step of bonding the upper substrate to the lower substrate are performed by interposing the upper substrate 5 and the lower substrate 6 between upper surface table 12 and lower surface table 13, applying a pressure to upper substrate 5 and lower substrate 6 and supplying entire surface of the upper substrate including the electrodes with the optical energy 2 for curing photocuring sealing material 7 as shown in FIG. 3.

In the method of manufacturing the conventional liquid crystal display element, the upper substrate and the lower substrate are entirely raised in temperature with light energy. According to a measurement, when light energy of 4000 mJ/cm$^2$ is irradiated by using a metal halide lamp for emitting light intensity of 80 mW/cm$^2$ or more to surface of a low alkali glass substrate generally used as the upper substrate and/or the lower substrate, the surface temperature of the low alkali glass substrate is increased up to about 70° C. Accordingly, curvature and distortion of the substrate are confirmed to be caused by difference in thermal expansion coefficient (or linear expansion coefficient) when upper and lower substrates are oppositely bonded, and material of the upper substrate is different from that of the lower substrate.

In Japanese Unexamined Patent Publication No. 127174/1993, there is disclosed a liquid crystal display element made by using an ultraviolet ray curing resin. In the publication, it is described that each surface temperature of the upper substrate and the lower substrate can be maintained at a room temperature when the ultraviolet ray curing resin is cured by irradiation of ultraviolet ray. Actually, it is extremely difficult that each surface temperature of the upper substrate and the lower substrate is kept at a room temperature when the ultraviolet ray is used.

In Japanese Unexamined Patent Publication No. 112128/1986, there is disclosed a liquid crystal display element made by using an ultraviolet ray curing resin. In the publication, it is described that the surface temperature of the upper substrate and the lower substrate can be maintained below about 50° C. when the ultraviolet ray curing resin is cured by irradiation of the ultraviolet ray. Actually, when the light energy of 4000 mJ/cm$^2$ necessary for curing the ultraviolet ray curing resin is irradiated, the surface temperature of the upper substrate and the lower substrate are elevated to about 70° C.

Further, in Japanese Unexamined Patent Publication No. 211396/1996 and Japanese Unexamined Patent Publication No. 219932/1986, there is disclosed a liquid crystal display element made by using an ultraviolet ray curing resin. In the publications, it is described that the surface temperature of the upper substrate and the lower substrate can be maintained at approximately room temperature when wind of a room temperature or cooling wind is used while the ultraviolet ray curing resin is cured through irradiation of ultraviolet ray. In reality, the surface temperature and the thermal expansion coefficient in the upper substrate are different from those in the lower substrate even under the cold temperature wind of room temperature or the cooling wind when the light energy of 4000 mJ/cm$^2$ necessary for curing the ultraviolet ray curing resin are irradiated, so as to cause the curvature and distortion of the upper and lower substrates.

Generally, a substrate having a lower thermal expansion coefficient (such as quartz glass substrate) is used in a case in which a temperature of substrate should be high, such as a case where polycrystalline silicon is used for forming a TFT. The thermal expansion coefficient of the quartz glass substrate is $5.5 \times 10^{-7}/°C$. Generally, a low alkali glass substrate is used as a substrate opposite to a substrate on which a TFT is formed (hereinafter referred to as "TFT substrate") in consideration of cost of the liquid crystal display element. The thermal expansion coefficient of the low alkali glass substrate is $44 \times 10^{-7}$ to $46 \times 10^{-7}/°C$. Namely, thermal expansion coefficient of the low alkali glass substrate is about ten times as much as that of the quartz glass substrate.

Furthermore, the quartz glass substrate absorbes lesser light and has a lower thermal expansion coefficient than the low alkali glass substrate because the quartz glass substrate contains lesser impurities compared with the low alkali glass substrate. According to a measurement, when light energy of 4000 $mJ/cm^2$ is irradiated by a metal halide lamp for emitting the light intensity of 80 $mW/cm^2$ or more in a surface of the quartz glass, the surface temperature of the quartz glass substrate is increased to about 30° C. In a liquid crystal display element of 3 inches of a diagonal line, which is manufactured by using a quartz glass substrate (temperature measured on a surface of the quartz glass substrate is 30° C.) as a upper substrate, and a low alkali glass substrate (temperature measured on a surface of the low alkali glass substrate is 70° C.) as the lower substrate; there is caused difference in expansion of about 13 $\mu m$ in a diagonal direction. When the difference in expansion is caused by the expansion due to heat, an aperture ratio of peripheral area of the liquid crystal display element is lowered as compared with the aperture ratio of central area of the liquid crystal display element. It is not preferable that the fluctuation of the aperture ratio is large within the liquid crystal display element because nonuniform of luminance of image is caused. When pixel size is 30 $\mu m \times 30 \mu m$ (for example, in a liquid crystal display element serving as a video graphics having a TFT formed by polycrystalline silicone increasing which to high temperature in a forming process (hereinafter referred to simply as "high temperature Poly-Si"), the difference in expansion of 13 $\mu m$ generated in the diagonal direction allows about 30% in aperture ratio to reduce, and therefore the difference in expansion is a problem in practical use. Hereinafter the above-mentioned video graphics is referred to as "high temperature Poly-SiVGA".

Even when material of an upper substrate is the same as that of a lower substrate opposed to the upper substrate, difference in temperature therebetween is caused when the light energy is irradiated from either of upper side and lower side of the opposing two substrate, and therefore the same problem described above is caused. In order to remove the difference in temperature, the light energy can be irradiated from both sides. In this case, there should not be any substrate that shields light beam on an optical path to the photocuring sealing material. When UV (ultraviolet lays) lamp cooled by a cooling water generally, which is used as an light source, is placed on the upper side in the manufacturing step, a fatal defect is applied to products when cooling water is leaked. Because of such a reason, the light energy is irradiated from either of upper side and lower side of the opposing two substrate, especially from the lower. A substrate on which TFT is provided absorbs light beam because the metallic thin film is formed on the substrate, thereby causing the temperature difference easy. According to a measurement, the temperature difference of 10° C. or more is caused between the opposing upper substrate and lower substrate. When UV sealing material is used as a photocuring sealing material in a large size substrate of 550 mm×650 mm, the distance between one end and the other end of each diagonal line in each of upper and lower substrates is 850 mm. If there is temperature difference of 10° C. between the opposing upper substrate and lower substrate, there is a difference in expansion of about 40 $\mu m$ in the diagonal direction between upper substrate and lower substrate. When the difference in expansion is caused by thermal expansion, the aperture ratio of peripheral area of the liquid crystal display element is lowered as compared with the aperture ratio of central area. It is not preferable that aperture ratio within the liquid crystal display element is widely varied because nonuniform in luminance of image is caused. When there is a difference in expansion of 40 $\mu m$ between upper substrate and lower substrate the opposing in the diagonal direction thereof, the aperture ratio changes by about 30% to cause a serious problem in practical use, provided that the pixel size is 100 $\mu m \times 300 \mu m$ (corresponding to XGA (Extended Graphics Array)) in a liquid crystal display element having a TFT formed by general amorphous silicon (hereinafter referred to simply as "a-SiTFT").

The positional shift between the opposing first substrate and second substrate causes lower lluminance or inferior indication due to the reduction of the aperture ratio of pixel. In a liquid crystal display element driven by active matrix driving method and including an active element such as TFT or MIM (metal-insulator-metal), a plurality of pixels are provided within a displaying area. In each pixel, active element is formed, and in displaying area of lower substrate, there are formed one signal lines for scanning the active element and another signal lines for inputting an image signal into each pixel, the one signal line and the another signal line forming a grid pattern. Each pixel is opposite to electrode which is formed on the lower substrate is electrically connected to the active element. In a color display, upper substrate opposed to the lower substrate is a substrate on which a color filter comprising red areas, green areas and blue areas is formed. Clearance between one area and another area adjoining the one area, namely, over the signal lines, there is a light shielding portion called BM (Black Matrix). When a positional shift is caused between the opposing upper and lower substrates, a lightproof operation in the pixel occurs due to the BM provided over a peripheral edge of the pixel. This is a problem caused by reduction of aperture ratio, so that reduction of lluminance is caused. When the positional shift is caused extremely, the light which is transmitted through a coloring matter comprising one pixel enters into another pixel adjoining the one pixel, and accordingly the positional shift is problem because the positional shift causes inferior indication.

SUMMARY OF THE INVENTION

An object of the present invention is to provide a method of manufacturing a liquid crystal display element capable of decreasing the reduction amount in the aperture ratio.

According to the present invention there is provided a method of manufacturing a liquid crystal display element comprising steps of:

(a) forming a electrode on a surface of at least one of an upper substrate and a lower substrate;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween; and (c) injecting liquid crystal into the gap, wherein the light energy is irradiated while each temperature of the upper substrate and the lower substrate is controlled to 55° C. or lower.

Preferably, the method of manufacturing the liquid crystal display element of claim 1, wherein the light energy is irradiated while each temperature of the upper substrate and the lower substrate is confirmed by using a temperature detecting element.

Preferably, the method of manufacturing the liquid crystal display element of claim 1, wherein a cooling means is provided on at least one surface of the upper substrate and the lower substrate.

Preferably, the method of manufacturing the liquid crystal display element of claim 1, wherein the photocuring sealing material is interposed between a peripheral edge of the upper substrate and a peripheral edge of the lower substrate while a pressure is applied to the upper substrate and the lower substrate.

According to the present invention there is provided a method of manufacturing a liquid crystal display element comprising steps of:

(a) forming a electrode on a surface of at least one of an upper substrate and a lower substrate;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween; and (c) injecting liquid crystal into the gap, wherein the light energy is irradiated while temperature difference between the upper substrate and the lower substrate is controlled to 5° C. or lower.

Prefarably, the method of manufacturing the liquid crystal display element of claim 5, wherein the light energy is irradiated while each temperature of the upper substrate and the lower substrate is confirmed by using a temperature detecting element.

Preferably, the method of manufacturing the liquid crystal display element of claim 5, a cooling means is provided on at least one surface of the upper substrate and the lower substrate.

Preferably, the method of manufacturing the liquid crystal display element of claim 5, wherein the photocuring sealing material is interposed between a peripheral edge of the upper substrate and a peripheral edge of the lower substrate while a pressure is added on the upper substrate and the lower substrate.

According to the present invention there is provided a method of manufacturing a liquid crystal display element comprising steps of:

(a) forming a electrode on a surface of at least one of an upper substrate and a lower substrate;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween; and (c) injecting liquid crystal into the gap, wherein the light energy is irradiated while each temperature of the upper substrate and the lower substrate is controlled to 55° C. or lower while temperature difference between the upper substrate and the lower substrate is controlled to 5° C. or lower.

Preferably, the method of manufacturing the liquid crystal display element of claim 9, wherein the light energy is irradiated while each temperature of the upper substrate and the lower substrate is confirmed by using a temperature detecting element.

Preferably, the method of manufacturing the liquid crystal display element of claim 9, a cooling means is provided on at least one surface of the upper substrate and the lower substrate.

Preferably, the method of manufacturing the liquid crystal display element of claim 9, wherein the photocuring sealing material is interposed between a peripheral edge of the upper substrate and a peripheral edge of the lower substrate while a pressure is applied to the upper substrate and the lower substrate.

DETAILED DESCRIPTION

Figure 1:
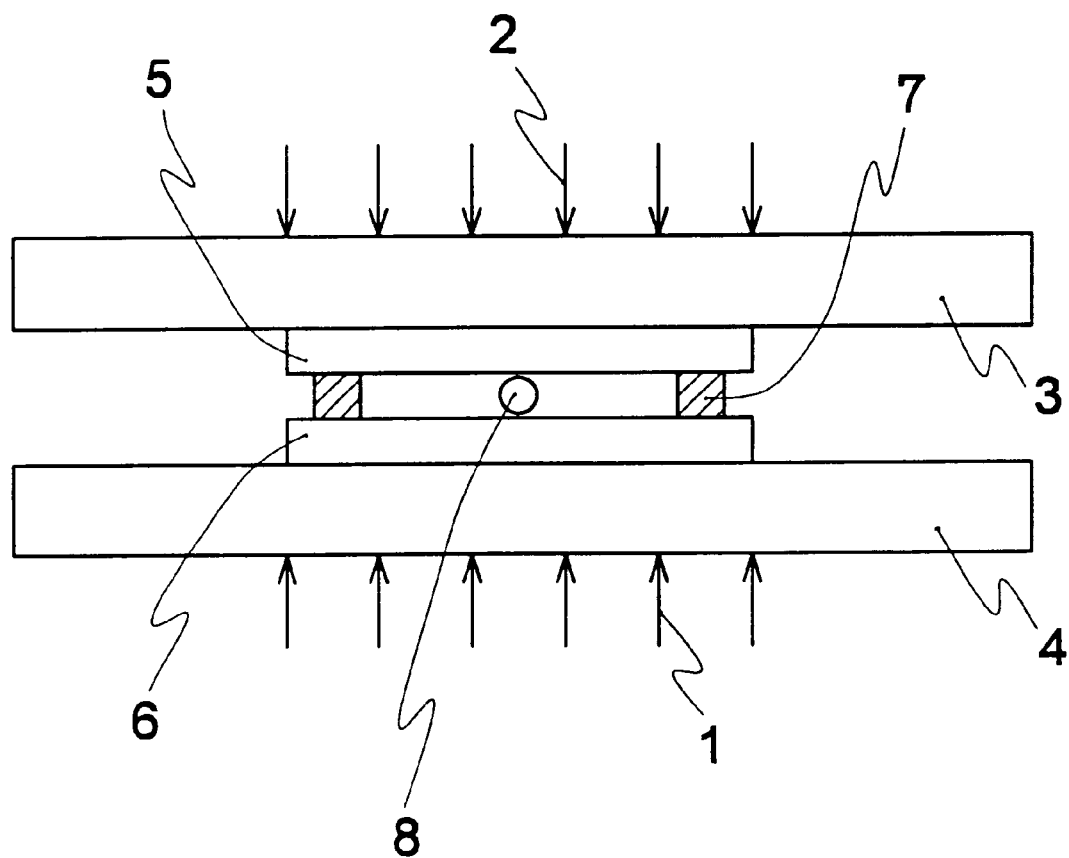
FIG. 1 is a sectional view showing an example of a manufacturing apparatus to be used for achieving a method of manufacturing a liquid crystal display element of the present invention.

Hereinafter, embodiments of a method of manufacturing a liquid crystal display element according to the present invention are explained referring to the drawings.

Embodiment 1

Embodiment 1 of a method of manufacturing a liquid crystal display element according to this invention is explained.

Table 1 shows amount of thermal expansion of each substrate and fluctuation (reduction amount) of aperture ratio of the liquid crystal display element at the respective temperatures. As shown in Table 1, there are used substrates, each thermal expansion coefficient of which is different from each other as an opposing upper substrate and a lower substrate in manufacturing the liquid crystal display element. In this specification, TFT substrate is used as lower substrate and CF substrate is used as upper substrate. The thermal expansion coefficient of quartz glass substrate is $5.5 \times 10^{-7}/°$ C. and the thermal expansion coefficient of CF substrate is $45 \times 10^{-7}/°$ C., because low alkali glass substrate is generally used as the CF substrate. The size of the liquid crystal display element is 3 inches (equal to about 7.5 cm) at a diagonal line. The pixel size is 30 $\mu$m×30 $\mu$m.

TABLE 1

| Substrate temperature (° C.) | 70 | 60 | 55 | 50 | 40 | 30 |
|---|---|---|---|---|---|---|
| Amount of thermal expansion of upper substrate ($\mu$m) | 15.19 | 11.81 | 10.13 | 8.4375 | 5.06 | 1.688 |
| Amount of thermal expansion of lower substrate ($\mu$m) | 1.856 | 1.444 | 1.238 | 1.031 | 0.619 | 0.206 |

TABLE 1-continued

| Difference (µm) | 13.33 | 10.37 | 8.89 | 7.41 | 4.44 | 1.48 |
|---|---|---|---|---|---|---|
| Reduction amount of aperture ratio (µm) | 27 | 20.7 | 17.8 | 14.8 | 8.9 | 3 |

The expansion coefficient of each substrate is defined by the following equation (1).

$$\text{Expansion coefficient of the substrate} = \text{thermal expansion coefficient} \times (\text{substrate length} \times (\text{substrate temperature} - \text{room temperature})) \quad (1)$$

Table 1 shows amount of the expansion of substrate calculated by the equation (1) as thermal expansion amount.

When material of the upper substrate is different from that of the lower substrate, the reduction amount of the aperture ratio is 3% when the substrate temperature is 30° C. The reduction amount of the aperture ratio is 27% when the substrate temperature is 70° C.

In the general liquid crystal display element, nonuniform of luminance of image within the display face is necessary to be controlled in such a manner that the fluctuation of the aperture ratio is deviated in a range of 20%.

For example, when in a liquid crystal display element the reduction of the aperture ratio is controlled in such a manner that the reduction of the aperture ratio is deviated within a range of about 20% from the data shown in Table 1, the substrate temperature has to be made 58.76° C. or lower. However, the substrate temperature should be maintained to 55° C. or lower in order to control the fluctuation of aperture ratio within a range of 20% if any errors in manufacture or change of panel size is taken into consideration.

When the low alkali glass substrate is used as the upper substrate, and the quartz glass substrate is used as lower substrate, at least temperature of upper substrate and the lower substrate are preferably maintained at 55° C. or lower, because the upper substrate is different from the lower substrate in thermal expansion coefficient.

In Embodiment 1, the low alkali glass substrate and the quartz glass substrate are used exemplarily as upper and lower substrates. In Embodiment 1, the thermal expansion coefficient of the upper substrate is ten times larger than that of the lower substrate. However, the combination of substrates are not limited thereof. So, when the thermal expansion coefficient of the upper substrate is ten times larger than that of the lower substrate, the same phenomenon as that of Embodiment 1 is caused.

The same phenomenon is caused even in a case where the upper substrate is TFT substrate and the lower substrate is CF substrate. There is not any dependency on the irradiating direction of the light energy, a calculation operation using the equation (1) is satisfied in any case.

Embodiment 2

Embodiment 2 of a method of manufacturing a liquid crystal display element according to this invention is explained.

Table 2 shows the amount of difference in thermal expansion between upper substrate and lower substrate due to the temperature difference to be caused therebetween and the fluctuation (reduction amount) of the aperture ratio of the liquid crystal display element. Table 2 shows a case where two substrates of the same thermal expansion coefficient are used as opposing two substrates. In Embodiment 2, generally, TFT substrate having a-SiTFT is the lower substrate and CF substrate is the upper substrate. The thermal expansion coefficients of upper substrate and lower substrate show $45 \times 10^{-7}/°$ C., because the low alkali glass substrates are generally used as upper substrate and lower substrate. Each size of the upper substrate and lower substrate is 550 mm×650 mm, and each diagonal distance of the upper substrate and lower substrate is 850 mm. The pixel size is 100 µm×300 µm.

TABLE 2

| Temperature difference between substrates (° C.) | 15 | 10 | 5 |
|---|---|---|---|
| Amount of difference in thermal expansion (µm) | 57.4 | 38.25 | 19.1 |
| Reduction amount in aperture ratio (%) | 57.4 | 38.25 | 19.1 |

The difference in thermal expansion amount is defined by the following equation (2).

$$\text{The amounts of difference in thermal expansion amounts} = \text{the thermal expansion coefficient of the substrate} \times \text{length of the substrate} \times \text{the temperature difference between the substrates} \quad (2)$$

Table 2 shows the amounts of difference in thermal expansion calculated with the equation (2).

In the case where material for the upper substrate is equal to that of the lower substrate, reduction amount in aperture ratio is 57.4% if temperature difference between substrates is 15° C., and reduction amount in aperture ratio is 19.1% if temperature difference between substrates is 5° C.

For example, in a liquid crystal display element, from which the data of Table 2 can be obtained, the temperature difference between the substrates has to be made 5° C. or lower as understood from Table 2 when the reduction amount of the aperture ratio is controlled in such a manner as to be deviated in a range of about 20% or lower.

When the low alkali glass substrates are used as the upper substrate and the lower substrate, at least the temperature difference between the upper substrate and the lower substrate is preferablly maintained at 5° C. or lower, because the thermal expansion coefficient of the upper substrate is equal to that of the lower substrate.

Each temperature of the upper substrate and the lower substrate is most preferable to be 55° C. or lower.

The same phenomenon is caused even in a case where the upper substrate is CF substrate and the lower substrate is TFT substrate. There is not any dependency on the irradiating direction of the light energy, a calculating operation using the equation (2) is satisfied in any case.

Embodiments of the manufacturing apparatus used for achieving Embodiments 1 and 2 are shown.

Embodiment 3

Embodiment 3 of a manufacturing apparatus used for achieving a method of manufacturing a liquid crystal display element according to the present invention is explained referring to the drawing.

FIG. 1 is a sectional view showing an example of the manufacturing apparatus to be used for achieving a method of manufacturing the liquid crystal display element of the present invention. Referring to FIG. 1, reference numeral 1 shows light energy, reference numeral 2 shows light energy, reference numeral 3 shows an upper surface table capable of transmitting the light energy 2, reference numeral 4 shows a lower surface table capable of transmitting the light energy 1, reference numeral 5 shows an upper substrate, reference numeral 6 shows a lower substrate, reference numeral 7 shows a photocuring sealing material, reference numeral 8 shows a spacer. For easier understanding, only one spacer 8 is shown.

When the liquid crystal panel is manufactured, a photocuring sealing material 7 is formed by screen printing on the peripheral edge of the upper substrate 5 (for example, 7059 made by CORNING GLASS WORKS or AN635 made by Asahi Glass Co., Ltd.) before injecting liquid crystal. In the lower substrate 6 opposed to the upper substrate 5 (for example, 7059 made by CORNING GLASS WORKS or AN635 made by Asahi Glass Co., Ltd.), there is arranged a spacer 8 (for example, micro pearl made by Sekisui Fine Chemical Ltd.) for retaining a gap between substrates in displaying area of the lower substrate. Upper substrate is bonded to lower substrate in such a manner as to be opposed to each other as shown in FIG. 1. In this condition, light energy 1 and light energy 2 are irradiated so that the photocuring sealing material 7 is cured.

Examples of the photocuring sealing material 7 include 3052B made by Three Bond Co., Ltd., X-765A1 made by Kyoritsu Chemical Industry Co., Ltd. and XNR5612 made by NAGASE CHIBA LTD.

The energy necessary for curing the photocuring sealing material 7 is 3000 mJ/cm$^2$ while 3052B made by Three Bond Co., Ltd. is used, is 1500 mJ/cm$^2$ while X-765A1 made by Kyoritsu Chemical Industry Co., Ltd. is used, or are 5000 mJ/cm$^2$ while XNR5612 made by NAGASE CHIBA LTD. is used. For a reliable curing operation, the light energy under the conditions suitable for the used photocuring sealing material is required to be irradiated.

Energy per unit area of light energy 1 irradiated on the lower substrate is identical to that of light energy 2 irradiated on the upper substrate 6.

Namely, the light energy 1 is identical to the light energy 2 except that irradiation directions thereof are different from each other. Although, there can be employed materials such as quartz glass used for forming optical fiber is desired as the material of the upper surface table 3 and the lower surface table 4, a material for light energy of 200 nm or more in wavelength to be transmitted such as glass substrate (for example, quartz glass substrate or low alkali glass substrate) used for material of TFT substrate. Each surface of the upper surface table 3 and the lower surface table 4 is flat to pressure-adhere the upper and lower substrates except for groove for absorbing the upper substrate 5 and the lower substrate 6.

For Example the groove is radially formed in, for example, on the surface of the upper surface table 3 and the lower surface table 4. The surface is contacted with the upper substrate 5 or the lower substrate 6. At least one through hole is provided in the groove. The upper substrate 5 or the lower substrate 6 is absorbed by suction through connection of the vacuum pump with the through hole.

The upper surface table 3 and the lower surface table 4 have a function of transmitting the light energy 1 and light energy 2 and can add a pressure capable of adhering under pressure the photocurring sealing material 7 so that a gap between the upper substrate 5 and the lower substrate 6 may be a prescribed size. The standard of the pressure is 0.01 to 1.5 kgf/cm$^2$. Within the pressure of such range, a liquid crystal display element having the substrate gap being a prescribed value can be obtained.

As the same light energy is irradiated upon the upper substrate 5 and the lower substrate 6 by feeding the light energy 1 and the light energy 2 from above and below, the temperatures to be caused in the upper substrate and the lower substrate become equal to each other. Thus, the temperature difference to be caused between the opposing upper substrate and the lower substrate can be made 5° C. or lower.

In a configuration where the temperature of the upper substrate 5 and the lower substrate 6 can be monitored during irradiation of the light energy 1 and light energy 2, the absolute amounts of the light energy 1 and light energy 2 can be controlled depending on rise of temperature of the substrate. As an example of such configuration, thermocouples mounted on each of the upper surface table 3 and the lower surface table 4 are emplyable. Further a temperature detector (for example, thermoviewer made by Nippon Avionixcs Co., Ltd.) is employable because the opposing upper surface table and the lower surface table are transparent. The temperature difference to be caused between the upper substrate and lower substrate can be controlled by this configuration.

In the invention, the photocuring sealing material used and the type of the light source are not essential elements, but can be selected according to working condition. Namely, the kind of photocuring sealing material and light source can be selected in accordance with performance of the liquid crystal display element.

Embodiment 4

Embodiment 2 of a manufacturing apparatus used for achieving a method of manufacturing a liquid crystal display element according to the present invention is explained referring to the drawing.

Figure 2:
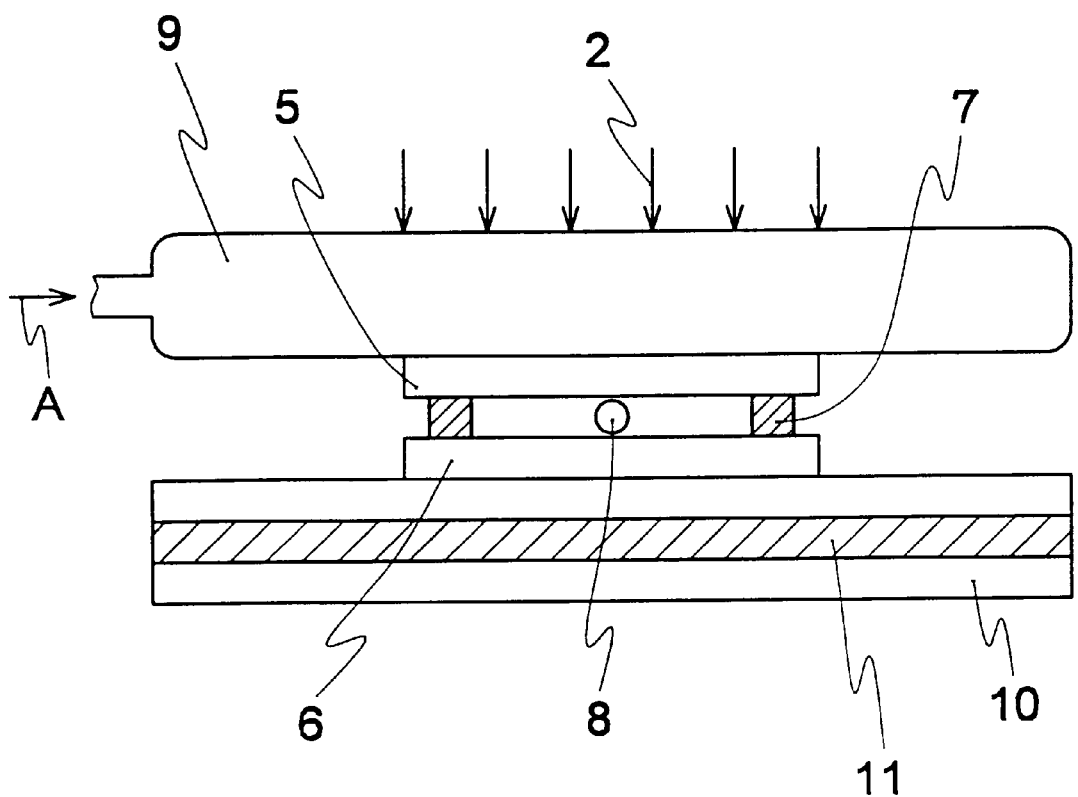
FIG. 2 is a sectional view showing an example 2 of a manufacturing apparatus to be used for achieving a method of manufacturing a liquid crystal display element of the present invention.
Figure 3:
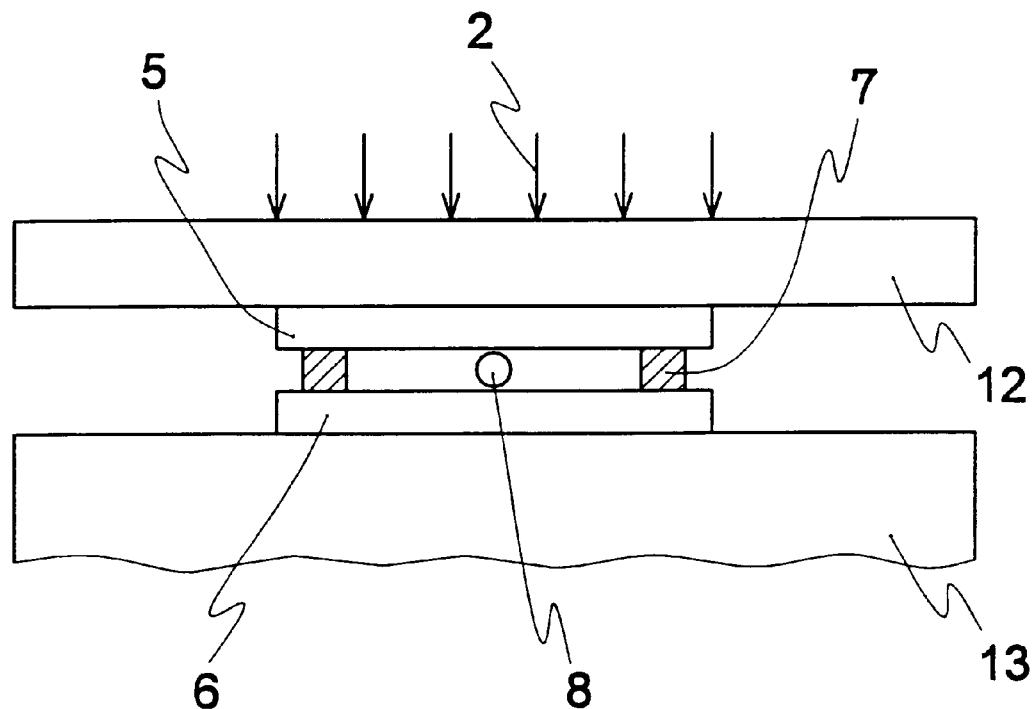
FIG. 3 is a sectional view showing one example of a manufacturing apparatus to be used in a method of manufacturing the conventional liquid crystal display element.

FIG. 2 is a sectional view showing an example 2 of a manufacturing apparatus to be used for achieving a method of manufacturing the liquid crystal display element of the present invention. Referring to FIG. 2, reference numeral 2 shows light energy, reference numeral 5 shows an upper substrate, reference numeral 6 shows a lower substrate, reference numeral 7 shows a photocuring sealing material, reference numeral 8 shows a spacer. Reference numeral 9 shows an air cushion which can transmit the light energy, and can feed a cavity portion with gas in the internal configuration from a direction shown by an arrow A. Reference numeral 10 shows a lower surface table. Reference numeral 11 shows a cooling medium having a cooling function.

In manufacuturing processes of the liquid crystal display element, before injecting liquid crystal, the photocuring sealing material 7 is formed on the peripheral edge of the upper substrate 5 by using a screen printing. In the lower substrate 6 opposed to the upper substrate 5 is arranged within a displaying area a spacer 8 (As an example of the spacer 8, Micro Pearl made by Sekisui Fine Chemical Ltd. can be employed) for retaining the substrate gap. Then, as shown in FIG. 2, two substrates are bonded is such a manner as to be opposite to each other. Under the condition, light energy 2 is applied to the photocuring sealing material 7 in such a manner as to cure the photocuring sealing material 7.

For example, there is 3052B made by Three Bond Co., Ltd., X-765A1 made by Kyoritsu Chemical Industry Co., Ltd. or XNR5612 made by NAGASE CHIBA LTD. as a photocuring sealing material 7.

The light energy necessary for curing the photocuring sealing material 7 is 300 mJ/cm$^2$ while 3052B made by Three Bond Co., Ltd., is 1500 mJ/cm$^2$ in X-765A1 made by Kyoritsu Chemical Industry Co., Ltd., or are 5000 mJ/cm$^2$ in XNR5612 made by NAGASE CHIBA LTD. as the photocuring sealing material 7. For reliable curing operation, the light energy suitable for the selected photocuring sealing material are required to be irradiated.

As a material for air cushion 9, there can be used a material through which light energy of 200 nm or more in wavelength can transmit, for example a glass such as quartz glass or low alkali glass which is used as material of a TFT substrate, the material being worked into a balloon-like shape. Gas to be fed into the interior is desired not to absorb the light energy. For example, nitrogen can be used. The pressure must be applied to the photocuring sealing material 7 in such a manner that a gap between the upper substrate 5 and the lower substrate 6 can be a prescribed size. For example, the pressure is in a range of 0.01 to 1.5 kgf/cm$^2$. Within the range of pressure, a liquid crystal display element which has a given value in the prescribed gap can be obtained.

The heat generated in the upper substrate 5 and the lower substrate 6 by light energy 2 is cooled by a cooling means provided in the central portion of the lower surface table 10. The cooling means is formed in such a manner in which for example, a cavity is formed in lower surface table 10, and which a cooling medium 11 having a large thermal capacity is fed into the cavity. For example, the cooling medium 11 is a fluid such as cooling water, cooling oil, or cooling gas for example $N_2$ gas or $O_2$ gas. The material making of the lower surface table 10 has only to be easily worked like SUS (chrome stainless steel), quartz glass or iron like solid and a material having a large thermal capacity.

As a photocuring sealing material 7, XNR5612 made by NAGASE CHIBA LTD. or 3052B made by Three Bond Co., Ltd., which can be cured with light energy, can be used. The wavelength of the light energy 2 are necessary to harden the photocuring sealing material 7.

Each temperature of the upper substrate 5 and the lower substrate 6 to be elevated by the light energy 2 can be controlled to 55° C. or lower by using the above-mentioned manufacturing apparatus and the fluctuation of the aperture ratio can be controlled within 20%.

In irradiating light energy 2, the temperature difference caused between upper and lower substrates is controlled to 5° C. or lower by monitoring each temperature of the upper substrate 5 and the lower substrate 6 by a temperature detecting element described in Embodiment 3 and by controlling temperature of the cooling medium 11 or irradiance of the light energy 2. When the gas to be fed into the air cushion 9 is more cold wind, marked effect can be obtained.

In the present invention, the photocuring sealing material to be used and a type of the light source are not indispensable requirements, but can be selected according to the using situation. Namely, the photocuring sealing material or the type of optical source can be selected in accordance with the performance of the liquid crystal display element.

The liquid element can be formed upside down to FIG. 2, the air cushion 9 can be replaced by the lower surface table 10 in the configuration of the manufacturing apparatus. In this case, the light energy 2 can be irradiated from the air cushion 9 side in the producing apparatus.

When a material through which the light energy transmit is selected as the material making of the lower surface table 10, and the cooling medium 11 is made a material which does not absorb the wavelength necessary for curing the photocuring sealing material 7, a manufacturing apparatus described in Embodiment 3 can be used. Thus, the light energy can be irradiated from both the below and above directions. When a manufacturing apparatus described in Embodiment 3 is used, the fluctuation amount of the aperture rate can be reduced, instead of adding an effect to be obtained by the manufacturing apparatus described in Embodiment 3.

According to the present invention there is provided a method of manufacturing a liquid crystal display element comprising steps of:

(a) forming a electrode on a surface of at least one of an upper substrate and a lower substrate;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween; and (c) injecting liquid crystal into the gap, wherein the light energy is irradiated while each temperature of the upper substrate and the lower substrate is controlled to 55° C. or lower. Consequently, difference between amount of thermal expansion of the upper substrate and amount of thermal expansion of the lower substrate is reduced.

Preferably, the method of manufacturing the liquid crystal display element of claim 1, wherein the light energy is irradiated while each temperature of the upper substrate and the lower substrate is confirmed by using a temperature detecting element. Consequently, the light energy can be controlled depending on rise of each temperature of the upper substrate and the lower substrate.

Preferably, the method of manufacturing the liquid crystal display element of claim 1, wherein a cooling means is provided on at least one surface of the upper substrate and the lower substrate. Consequently, difference between amount of thermal expansion of the upper substrate and amount of thermal expansion of the lower substrate is reduced by controlling temperature of the cooling means.

Preferably, the method of manufacturing the liquid crystal display element of claim 1, wherein the photocuring sealing material is interposed between a peripheral edge of the upper substrate and a peripheral edge of the lower substrate while a pressure is applied to the upper substrate and the lower substrate. Consequently, the light energy is easily irradiated to the photocuring sealing material by feeding gas not to absorb the light energy into an interior of air cusion.

According to the present invention there is provided a method of manufacturing a liquid crystal display element comprising steps of:

(a) forming a electrode on a surface of at least one of an upper substrate and a lower substrate;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween; and (c) injecting liquid crystal into the gap, wherein the light energy is irradiated while temperature difference between the upper substrate and the lower substrate is controlled to 5° C. or lower. Consequently, difference between amount of thermal expansion of the upper substrate and amount of thermal expansion of the lower substrate is reduced.

Preferably, the method of manufacturing the liquid crystal display element of claim 5, wherein the light energy is irradiated while each temperature of the upper substrate and the lower substrate is confirmed by using a temperature detecting element. Consequently, the light energy can be controlled depending on rise of each temperature of the upper substrate and the lower substrate.

Preferably, the method of manufacturing the liquid crystal display element of claim 5, a cooling means is provided on at least one surface of the upper substrate and the lower substrate. Consequently, difference between amount of thermal expansion of the upper substrate and amount of thermal expansion of the lower substrate is reduced by controlling temperature of the cooling means.

Preferably, the method of manufacturing the liquid crystal display element of claim 5, wherein the photocuring sealing material is interposed between a peripheral edge of the upper substrate and a peripheral edge of the lower substrate while a pressure is added on the upper substrate and the lower substrate. Consequently, the light energy is easily irradiated to the photocuring sealing material by feeding gas not to absorb the light energy into an interior of air cusion.

According to the present invention there is provided a method of manufacturing a liquid crystal display element comprising steps of:

(a) forming a electrode on a surface of at least one of an upper substrate and a lower substrate;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween; and (c) injecting liquid crystal into the gap, wherein the light energy is irradiated while each temperature of the upper substrate and the lower substrate is controlled to 55° C. or lower while temperature difference between the upper substrate and the lower substrate is controlled to 5° C. or lower. Consequently, difference between amount of thermal expansion of the upper substrate and amount of thermal expansion of the lower substrate is reduced.

Preferably, the method of manufacturing the liquid crystal display element of claim 9, wherein the light energy is irradiated while each temperature of the upper substrate and the lower substrate is confirmed by using a temperature detecting element. Consequently, the light energy can be controlled depending on rise of each temperature of the upper substrate and the lower substrate.

Preferably, the method of manufacturing the liquid crystal display element of claim 9, a cooling means is provided on at least one surface of the upper substrate and the lower substrate. Consequently, difference between amount of thermal expansion of the upper substrate and amount of thermal expansion of the lower substrate is reduced by controlling temperature of the cooling means.

Preferably, the method of manufacturing the liquid crystal display element of claim 9, wherein the photocuring sealing material is interposed between a peripheral edge of the upper substrate and a peripheral edge of the lower substrate while a pressure is applied to the upper substrate and the lower substrate. Consequently, the light energy is easily irradiated to the photocuring sealing material by feeding gas not to absorb the light energy into an interior of air cusion.

Though several embodiments of the present invention described above, it is to be understood that the present invention is not limited to the above-mentioned embodiments, and various changes and modifications may be made in the invention without departing from the spirit and scope thereof.

What is claimed is:

1. A method of manufacturing a liquid crystal display element comprising the steps of:

(a) forming an electrode on a surface of at least one of an upper substrate and a lower substrate, the upper and lower substrates having different thermal expansion coefficients;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween;

(c) injecting liquid crystal into the gap; and (d) controlling a temperature of each of the upper substrate and the lower substrate to 55° C. or lower while the light energy is irradiated and even when the light energy is at 5000 mJ/cm$^2$, and based on a predetermined difference between said thermal expansion coefficients.

2. The method of manufacturing the liquid crystal display element of claim 1, wherein the light energy is irradiated while each temperature of the upper substrate and the lower substrate is confirmed by using a temperature detecting element.

3. The method of manufacturing the liquid crystal display element of claim 1, wherein a cooling means is provided on at least one surface of the upper substrate and the lower substrate.

4. The method of manufacturing the liquid crystal display element of claim 1, wherein the photocuring sealing material is interposed between a peripheral edge of the upper substrate and a peripheral edge of the lower substrate while a pressure is applied to the upper substrate and the lower substrate.

5. A method of manufacturing a liquid crystal display element comprising the steps of:

(a) forming an electrode on a surface of at least one of an upper substrate and a lower substrate;

(b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween;

(c) injecting liquid crystal into the gap; and (d) controlling a temperature difference between the upper substrate and the lower substrate to 5° C. or lower and even when the light energy is at 5000 mJ/cm$^2$.

6. The method of manufacturing the liquid crystal display element of claim 5, wherein the light energy is irradiated while each temperature of the upper substrate and the lower substrate is confirmed by using a temperature detecting element.

7. The method of manufacturing the liquid crystal display element of claim 5, a cooling means is provided on at least one surface of the upper substrate and the lower substrate.

8. The method of manufacturing the liquid crystal display element of claim 5, wherein the photocuring sealing material is interposed between a peripheral edge of the upper substrate and a peripheral edge of the lower substrate while a pressure is added on the upper substrate and the lower substrate.

9. A method of manufacturing a liquid crystal display element comprising the steps of:
   (a) forming an electrode on a surface of at least one of an upper substrate and a lower substrate;
   (b) interposing a photocuring sealing material between a peripheral edge of the upper substrate and a peripheral edge of the lower substrate, and irradiating light energy for curing the photocuring sealing material, so that the upper substrate is bonded to the lower substrate in such a manner that a gap is interposed therebetween;
   (c) injecting liquid crystal into the gap;
   (d) controlling a temperature of each of the upper substrate and the lower substrate to 55° C. or lower while the light energy is irradiated and even when the light energy is at 5000 mJ/cm$^2$, and based on a predetermined difference between said thermal expansion coefficients; and
   (e) controlling a temperature difference between the upper substrate and the lower substrate to 5° C. or lower.

10. The method of manufacturing the liquid crystal display element of claim 9, wherein the light energy is irradiated while each temperature of the upper substrate and the lower substrate is confirmed by using a temperature detecting element.

11. The method of manufacturing the liquid crystal display element of claim 9, a cooling means is provided on at least one surface of the upper substrate and the lower substrate.

12. The method of manufacturing the liquid crystal display element of claim 9, wherein the photocuring sealing material is interposed between a peripheral edge of the upper substrate and a peripheral edge of the lower substrate while a pressure is applied to the upper substrate and the lower substrate.

* * * * *

UNITED STATES PATENT AND TRADEMARK OFFICE
CERTIFICATE OF CORRECTION

PATENT NO. : 5,959,712
DATED : September 28, 1999
INVENTOR(S) : Yasuhiro MORII et al.

It is certified that error appears in the above-identified patent and that said Letters Patent is hereby corrected as shown below:

On the title page, item [30], the Foreign Application Priority Data is missing. It should be:

--[30] Foreign Application Priority Data

Jul. 11, 1997 [JP] Japan.................9-186589--

Signed and Sealed this

Twenty-eighth Day of November, 2000

Attest:

Q. TODD DICKINSON

Attesting Officer

Director of Patents and Trademarks